United States Patent [19]
Schirmer

[11] 3,755,062
[45] Aug. 28, 1973

[54] FABRIC FORMED BY HEAT SEALING, SHRINKING AND FOAMING BACKING

[75] Inventor: Henry G. Schirmer, Spartanburg, S.C.

[73] Assignee: W. R. Grace & Co., Duncan, S.C.

[22] Filed: July 21, 1971

[21] Appl. No.: 164,549

[52] U.S. Cl............ 161/146, 28/72 R, 156/85, 161/65, 161/148, 161/151, 161/402
[51] Int. Cl............ B32b 7/04, B32b 3/00
[58] Field of Search............ 161/46, 47, 72, 73, 161/74, 76, 79, 88, 92, 98, 121, 129, 130, 135, 140, 151, 152, 156, 157, 250, 402, 412, 146, 148; 156/85; 28/72, 74 R

[56] References Cited
UNITED STATES PATENTS

| | | | |
|---|---|---|---|
| 3,485,699 | 12/1969 | Bassett et al. | 161/148 X |
| 2,977,664 | 4/1961 | Grajeck | 28/74 R |
| 3,131,113 | 4/1964 | Arbit et al. | 161/250 X |
| 2,966,439 | 12/1960 | Sorel | 161/250 X |
| 3,081,571 | 3/1963 | Dayen et al. | 161/146 X |
| 3,285,800 | 11/1966 | Bartell et al. | 161/250 X |
| 2,804,419 | 8/1957 | De Woskin et al. | 161/92 X |
| 3,360,412 | 12/1967 | James | 161/250 X |

OTHER PUBLICATIONS

Modern Plastics, June 1962, p. 104.

Primary Examiner—Harold Ansher
Assistant Examiner—Paul Thibodeau
Attorney—John J. Toney, Edward J. Hanson, Jr. et al.

[57] ABSTRACT

A non-woven rug, or the like, is formed by heat sealing a covering material at spaced intervals to a plastic backing and thereafter shrinking the backing to bulk the facing fabric. The heat sealing of the facing fabric to the backing causes a partial loss of orientation in the seal area therein bringing about a bulking or crinkling of the backing. The backing is preferably of a thermoplastic material having a foaming agent incorporated therein which is foamed after the completion of the heat sealing and heat shrinking procedures. Also included in the disclosure are the features of the backing fabric independently, i.e., incorporation of a foaming agent into a plastic which is extruded and thereafter heat sealed and/or stretch oriented and shrunk prior to the activation of the foaming agent to foam the fabric.

2 Claims, 6 Drawing Figures

Patented Aug. 28, 1973

INVENTOR
HENRY G. SCHIRMER
BY Edward J. Hanson Jr.
ATTORNEY

Patented Aug. 28, 1973

FABRIC FORMED BY HEAT SEALING, SHRINKING AND FOAMING BACKING

BACKGROUND OF THE INVENTION

This invention relates to a fabric that includes a base sheet covered by a facing fabric and special foamed sheets suitable for inclusion in the fabric as the base sheet. The invention also relates to a method for producing such a fabric and to methods for producing the foamed base sheet as an intergral part of the fabric or independently.

The prior art reveals base sheets provided with crinkled facing fabric. Examples of such fabrics may be found in Pat. Nos. 2,245,289 and 2,075,189. U.S. Pat. No. 3,432,447 reveals a plastic sheet that has a foaming agent incorporated in it before extrusion, is formed by extrusion without decomposing the foaming agent, irradiated, and thereafter foamed by activation of the foaming agent. The prior art, however, does not provide a fabric having a conventional pile rug appearance that lends itself to the easy construction of such advantage as is provided by applicant.

It is, therefore, an object of this invention to provide a new fabric suitable for use as a rug or the like.

It is another object of this invention to provide a new, inexpensive and expedient method for producing such a fabric.

It is a further object of this invention to provide a new foamed sheet and a method for the production thereof whereby the sheet may be first oriented and/or heat sealed and thereafter foamed.

SUMMARY OF THE INVENTION

By an aspect of the invention, a new fabric is provided having a fibrous material bonded to a base sheet of shrunk material with the fibrous material being crinkled. The shrunk material is preferably a plastic and the fibrous material is preferably welded to it.

By another aspect of the invention, a method is provided for forming the fabric by bonding a fibrous material to a shrinkable sheet and shrinking the sheet and crinkling the fibrous material. In a preferred embodiment, the fibrous material is bonded to the shrinkable sheet at intervals by means at least partially relieving the shrinkability of the shrinkable sheet at the intervals. The shrinkable sheet is preferably an oriented thermoplastic sheet and the bonding includes pressing spaced portions of the fibrous material into the oriented thermoplastic sheet with a heated bar means while preventing the bonding of the fibrous material to the sheet intermediate the intervals. Preferably the shrinking is carried out after the bonding or heat sealing.

The shrinkable sheet is preferably formed by incorporating a heat activated foaming agent into the thermoplastic material before the sheet is formed, preferably by extrusion at a temperature below the decomposition temperature of the foaming agent. After the extrusion forming of the sheet, the heat sealing is carried out followed by the shrinking of the sheet. After completion of this phase of the sheet's treatment, the foaming agent is activated by subjecting the sheet to a heat at a temperature above that previously used and sufficient to bring about the activation of the foaming agent to foam the sheet.

By other aspects of the invention, a method is provided for forming an oriented and foamed plastic article by stretching the article before the completion of the foaming thereof. A procedure is also provided for forming a heat sealed and foamed plastic article by heat sealing the article before the completion of the foaming thereof. These processes can be combined so that the article may be oriented, heat sealed and shrunk prior to foaming and through these processes new products are provided characterized by their method of formation.

DESCRIPTION OF THE PREFERRED EMBODIMENTS

Figure 2:
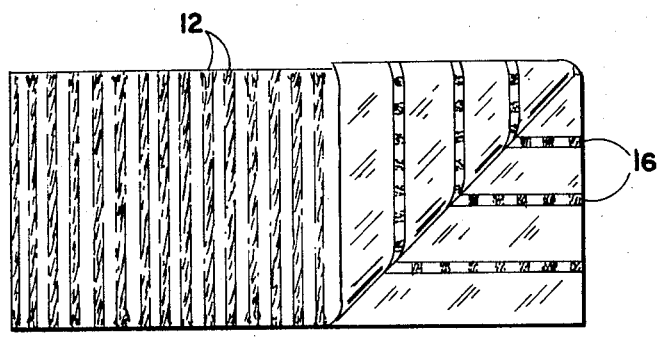
FIG. 2 is a schematic plan view of a folded over piece of the pre-fabric (before shrinking) of FIG. 1 with a corner turned up to show the heat sealing lines crossing the thread bundles.
Figure 1:
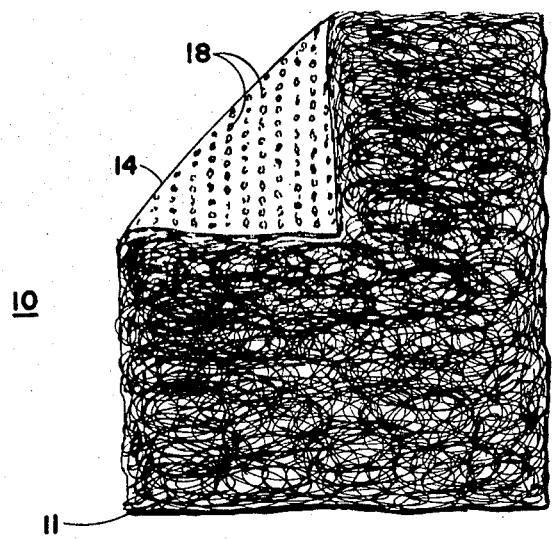
FIG. 1 is a schematic plan view of the fabric of my invention with the upper left hand edge turned up to exhibit the base sheet side thereof.

Looking first at FIG. 1, an improved fabric 10 of my invention is shown. Fabric 10 has a fibrous face material 11 which is formed from a plurality of yarn bundles 12, shown in FIG. 2. The preferred yarn bundles have at least one twist per inch and are preferably spaced one-quarter to 2 inches apart in parallel rows. A spacing of at least one-quarter inch generally provides enough face yarn coverage and a spacing of less than 1 inch is most preferred in the usual instance. Wider spacings are, of course, preferred, if they give sufficient coverage, in the sense that they use less yarn. It is, of course, normally essential that the face yarn totally cover the base sheet 14 in the finished fabric to provide a pleasing effect. There could even be instances where there would be no spacing, in other words the spacing would be 0.

The base sheet 14 is preferably formed of a plastic material, preferably a thermoplastic material. A particularly suitable thermoplastic has been found to be low density polyethylene although any olefin polymer having from two to eight carbon atoms and including at least 50 percent olefin polymer is considered very desirable. However, it is to be understood that other plastic materials would provide good results in proper instances. The fibrous face yarn is also preferably a synthetic yarn and nylon, polypropylene and polyethylene yarns have been found very suitable although this invention is not limited to synthetic yarns, natural yarns also being useful in particular applications.

In producing the fabric of this invention, it is essential that the base sheet be shrinkable and dimensionally stable in unrestrained circumstances in its unshrunk condition. It is thus essential that the sheet have shrinkability in at least one direction. Usually this direction would preferably be longitudinally so that a continuous production of the fabric could be carried out. Preferably the sheet would have at least 25 percent longitudinal free shrink and more preferably 25 to 75 percent at 300°F. In most applications, it is also very desirable to provide transverse shrinkage and this is essential if a special bulking of the base sheet is to be provided as hereinafter described. While the transverse shrink is not required, a slight transverse shrink pulls all of the yarn together making a tight yarn face on the fabric 10. Preferably the transverse free shrink would be at least 25 percent and more preferably 25 to 75 percent at 300°F.

A preferred backing sheet is produced by extruding a thermoplastic sheet in tubular form by the normally understood commercial process and orienting the sheet by the known bubble technique to provide the required shrink characteristics. Preferably the tubular film is stretched in both directions 3:1–5:1 to provide a biaxial orientation or stretch of 10:1–25:1 biaxially. After the plastic material has been oriented, the tubing is slit by the normally understood commercial process to complete the formation of the plastic sheet. The film could also be cast or formed in other ways in certain situations and in certain situations it could be oriented by tenter frame or other procedures.

The bundles of face yarn are preferably heat sealed to the base sheet by a heated bar means that extends continuously substantially across the thermoplastic sheet in a path. The heat sealing bonding of the fibrous material to the shrinkable sheet is carried out by pressing spaced portions of the fibrous material into the sheet with a heated bar means at intervals. The heated bar means engages the fibrous material and the sheet sequentially substantially across the sheet in a path. The sheet and fibrous material are generally moved in timed sequence with the bar means in a path under the bar means to achieve sealing with the desired spacing preventing the bonding of the fibrous material to the oriented sheet intermediate the intervals. Other bonding methods, such as the application of an adhesive, could be used in special situations. The preferred method provides a fusion between the preferred synthetic yarn which are thermoplastic and the olefin thermoplastic sheet.

The bonding of the fibrous material to the shrinkable sheet is preferably completed before the completion of the shrinking of the sheet to provide good control during the bonding operation. However, the heat sealing bar generally relieves some of the shrinkability or orientation in the oriented sheet at the intervals where the bar engages the sheet, which places are illustrated at 16 in FIG. 2. The sheet is shown folded in FIG. 2 so that the back side of the folded sheet may better illlustrate this feature. Generally the polymer must be above the plymer's crystalline melting point to seal and generally 100°F. above the crystalline melting point in order to provide a good seal. This usually requires a temperature in excess of 300°–400°F. on the preferred materials and, of course, the sealer may be much hotter. For example, with an impulse sealer, which provides a good means for sealing the fibrous material to the shrinkable sheet, bar temperatures as high as 1,000°F. are not unusual.

After the fibrous material has been heat sealed to the sheet, the sheet is preferably heat shrunk by subjecting the oriented thermoplastic sheet, with the bonded fibrous material, to a temperature sufficient to relieve some of the orientation thereof. Generally with the preferred materials this temperature will be above 180°F. and preferably at about 200° to 260°F. Temperatures of 160°F. to 260°F. and even higher are operable in many instances. The shrinking is carried out until the fibrous material is crinkled or buckled up predominantly parallel with the path of the heat sealing bar across the backing sheet and preferably until the backing sheet is crinkled laterally to the path of the heating bar means thereacross. The face yarn fibers are buckled up between the intervals of the seals and the base sheet is buckled up at the intervals of the seals although this tends to ripple the base sheet somewhat. It has been discovered that if the orientation of the backing sheet was previously relieved in those areas contacted by the heat sealing bar, the backing sheet itself distorts and becomes rippled in the areas contacted by the yarn frequently pulling up slightly so that looking from the back of the sheet small depressions 18 may be seen in FIG. 1. Thus upon heat shrinking the preferred thermoplastic backing sheet, it is crinkled laterally to the path the heated bar took across the sheet at the spaced intervals of contact. This increases the bulk of the finished fabric 10. The face yarn or fibrous material will normally be bulked at least 2:1. In other words, the fibrous material buckled up between the intervals is at least twice as long as the distance between the intervals in the shrunken sheet. Preferably the bulking should be 2:1–4:1. The shrinking of the thermoplastic backing sheet should normally be continued until the thermoplastic sheet has shrunk at least 25 percent longitudinally, more preferably 25 to 75 percent and in the more preferred forms 25 percent transversely, more preferably 25 to 75 percent and the backing sheet is substantially completely dimensionally stablized against shrinking at temperatures below 180°F.

A special effect is produced when the face yarn is made up of yarn bundles having a substantial number of strands therein. For example, 20 to 100 strands, with the bundle being twisted. In this instance, when the sealing bar contacts the bundle generally only the strands most directly against the backing sheet are adhered to the backing sheet producing an effect as shown in FIG. 1 of long and short looping of random groups of strands in each bundle. Thus, some of the strands will be attached to the backing sheet at adjacent sealing bar paths while other strands will be unattached over several sealing intervals. Of course, the strands must be of the type that are not sealed together by the heat of the sealing bar.

Special effects could also be produced by other means, for example by skipping the sealing of the various parallel yarn bundles in various patterns or even randomly.

NON-WOVEN FABRIC FACE MATERIAL

Figure 4:
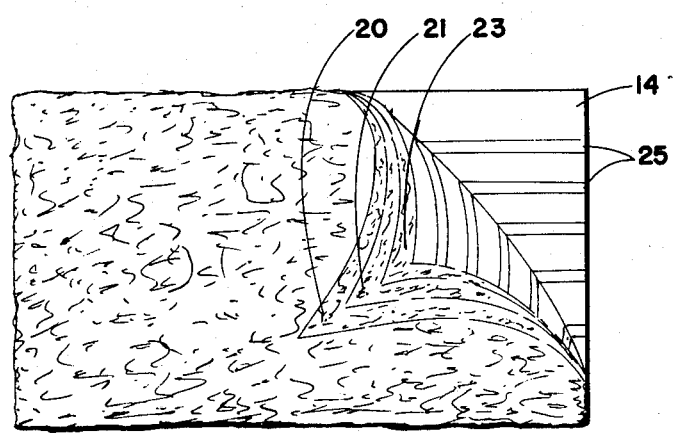
FIG. 4 is a schematic plan view of the pre-fabric of FIG. 3 showing three layers of non-woven fabric heat sealed to the base sheet.

In one preferred form of my invention webs of non-woven fabrics such as that produced in U.S. Pat. No. 3,539,666 assigned to the same assignee as this application are laid over the backing sheet 14 as seen in FIG. 4, preferably in multiple ply as illustrated by fabric plies 20, 21 and 23. This provides the fabric 19 of this invention shown in FIG. 3. The fibrous material in the form of a synthetic non-woven web of open character and continuous fiber is fusion bonded to the olefin material in the preferred form of this embodiment in the same manner as the yarn was bonded to the base sheet as previously described. The bonded material extends in bonded engagement with the base sheet continuously substantially thereacross. Because the webbing is continuous, when the backing sheet is shrunk in the manner previously described, the face fabric forms a somewhat corrugated looking appearance. It will be understood that the paths 25 made by the sealing bars shown in FIG. 4 would be in the troughs 26 of the finished fabric 19 shown in FIG. 3 with the high parts of the corrugation 27 being buckled up by the shrinking. As described respecting fabric 10, fabric 19 is the preferred form with both longitudinal and transverse shrinking of the base sheet, thereby buckling the corrugations laterally as shown at 28. The backing sheet would preferably shrink biaxially 50 to 75 percent in each direction thus shortening the distance between points of attachment of the face fabric from 1 inch to one-quarter inch in each direction except where the orientation was relieved by heat sealing. Thus the bulking would preferably be 2:1 to 4:1 in each direction or 4:1 to 16:1 biaxially.

Figure 5:
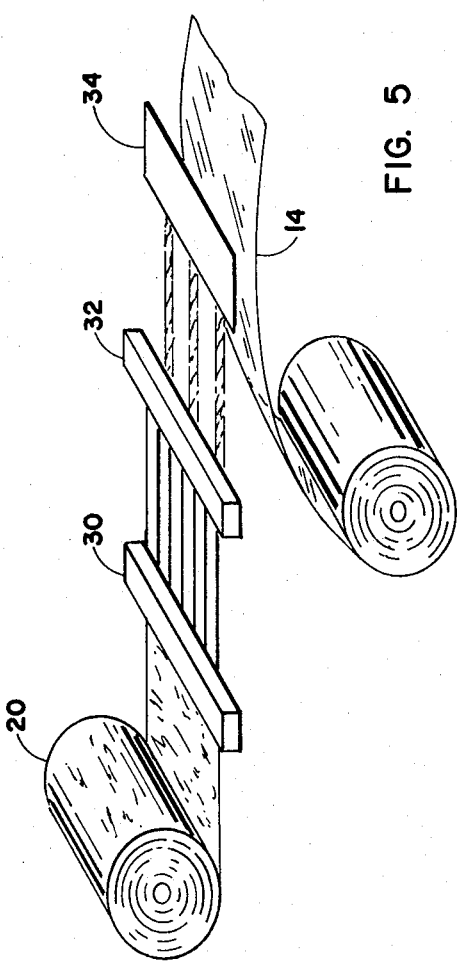
FIG. 5 is a schematic diagrammatic flow diagram of the preferred process for producing one embodiment of my fabric.

In a still further embodiment, the non-woven fabric 20 may be handled as shown in FIG. 5. In this embodiment it may be seen that the non-woven fabric 20 is provided in roll forms, run through a slitter 30, passed to a twister 32 and then delivered over a backing sheet 14 where a heat seal bar means 34 applies the twisted strands to produce the same sort of pattern shown in FIG. 2. In all other respects, the procedure for providing the fabric would be as described with respect to the production of the fabric 10 shown in FIGS. 1 and 2.

FOAMED BACKING SHEET EMBODIMENT

In the most preferred embodiment of my invention, a foaming agent is incorporated into the plastic before extrusion and the plastic is extruded (although casting or other methods of forming the backing sheet might be posssible in special situations) to form an article without activating the foaming agent. The preferred article is a non-foamed but foamable sheet or film. The foaming agent is preferably a heat activated foaming agent and a particularly desirable one is a powdered azodicarbamide, also called azobisformamide, foaming agent. The polymers previously described are excellent for use in forming such a backing sheet. The plastic material with the foaming agent therein is preferably extruded as a tubular film at a temperature below the decomposition temperature of the foaming agent.

After the tubing is formed, it is preferable to irradiate the tubular film until a dosage of 2–50 MR (megarads) more preferably between 10 and 50 MR and most preferably about 12 MR and sufficient to provide a percent gel of from about 20–80 percent more preferably 30–80 percent in the irradiated material. After irradiation, the irradiated tubular film is preferably oriented by the bubble technique out of a hot water bath maintained at a temperature between 200°–212°F. The film is stretched in each direction the preferred amounts referred to for the non foamable film. Of course, if the particular plastic or polymer used in the backing has a higher or lower orientation temperature requirement, then the appropriate temperature should be used. Furthermore, in these and other special situations other heating means could be employed, for example, a hot air oven. Irradiation makes the film much more resistant to burn-through during heat sealing and can be used advantageously in many instances with the earlier discussed embodiments.

The bonding of the fibrous material to the shrinkable sheet is carried out by pressing spaced portions of the fibrous material into the sheet with a heated bar means at intervals as previously described and relieving some of the shrinkability of the sheet at the intervals while preventing the bonding of the fibrous material to the sheet intermediate the intervals. The heated bar means engages the fibrous material and the sheet sequentially substantially across the sheet in a path and the bonding is preferably carried out before the completion of the shrinking of the sheet. The film is heat sealed at a temperature below the decomposition temperature of the foaming agent and with the preferred materials preferably at about 300°–400°F.

After the fibrous material has been bonded to the shrinkable sheet of base material, the base material is shrunk. The shrinking is carried out by subjecting the sheet to heat at a temperature below the temperature of activation of the foaming agent to relieve the orientation thereof. In actuality the entire composite is usually subjected to the heat. The film may be seen to have been shrunk after its orientation but before its foaming. The foaming or activation of the foaming agent is carried out by subjecting the sheet of base material (in fact, the entire composite is usually subjected to the heat) to a temperature above the decomposition temperature of the foaming agent and in a usual preferred case 350°–600°F. and more preferably 400°F. to 500°F. to activate the foaming agent or decompose the foaming agent and foam the sheet.

Figure 3:
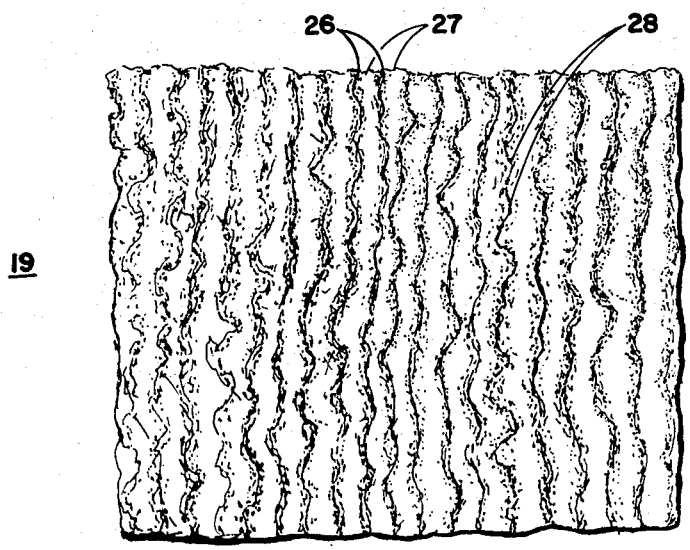
FIG. 3 is a schematic plan view of the fabric of another embodiment of my invention.
Figure 6:
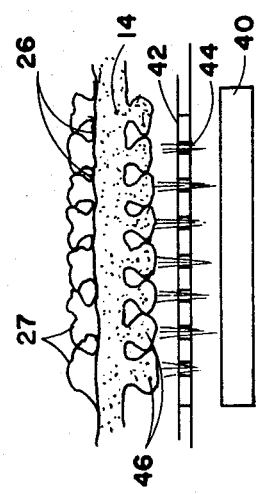
FIG. 6 is a schematic cross section through the foamed embodiment of the fabric of FIG. 3.

It is an important aspect of this invention in producing the preferred fabric thereof to foam the sheet in a pattern. This is illustrated in FIG. 6. In FIG. 6 the fabric of FIG. 3 is shown. Looking at FIG. 6, the corrugations 27 are shown in cross section along with the backing sheet 14 to which the non-woven web is attached by heat sealing in the troughs 26. A heating source 40 is shown below a shielding grid 42 having holes 44 therein to admit heat to restricted areas of the backing sheet 14 to bring about foam stalks 46 which project out of the sheet in the regions contacted by the heat passing through the apertures 44. If the sheet was not foamed using this protective procedure, the sheet would expand longitudinally and transversely as well as in thickness, thus dissipating at least a part of the characteristic obtained by shrinking the sheet to bulk the face yarn as well as the sheet itself.

When the foaming agent's decomposition or activation temperature is substantially above the crystalline melt point of the polymer, crosslinking of the polymer by irradiation or chemical crosslinking or some other means of preventing flow of the polymer during the activation of the foaming agent is quite important and in the usual situation critical. Otherwise, the polymer would loose its coherency. Irradiation causes the polymer to gel and thus remain a coherent mass.

INDEPENDENT FEATURES OF THE BACKING SHEET

By an aspect of this invention, the backing sheet could be used independently in two different embodiments. In a first embodiment, an oriented and foamed plastic article would be provided characterized by having been formed by stretch orienting the article before the completion of the foaming thereof. In a preferred form, the article would be an irradiated low density polyethylene film further characterized by having been heat sealed and shrunk prior to the completion of the foaming thereof. In a second embodiment, a heat sealed and foamed article would be provided characterized by having been formed by heat sealing the article before the completion of the foaming thereof. In a preferred embodiment, the article would be an irradiated low density polyethylene film further characterized by having been stretch oriented and shrunk prior to the completion of the foaming thereof. The method for producing these articles has already been described in respect to the production of the backing sheet. The description will, therefore, not be repeated.

PREFERRED LAMINATE BACKING EMBODIMENT

In many instances the backing sheet in its preferred form would be a laminate to provide the properties of several different materials each of which would have specific desired properties that did not exist in the other plies. A particularly desirable laminate would be one having one face presenting a lamina giving good adhering properties for the attachment of the face yarn. An intermediate lamina would desirably have the strength properties needed in the backing sheet. An outer lamina on the opposite face of the sheet from that to which the face yarn is to be applied, would provide good characteristics for the mounting of the finished product, for example if the finished product is to be placed on the floor a foam outer lamina would provide a good finished rug all in a single commercial manufacturing procedure. An example of such a laminate would be a laminate for use with polypropylene face yarn having a polypropylene outer lamina for heat sealing to the polypropylene face yarn. The intermediate lamina would be an irradiated and biaxial oriented polyethylene lamina which would give good strength and support as well as burn through resistance during the adhering of the face yarn. In this type of laminate, it would usually be desirable to provide an intermediate adhesive lamina or coating primer of ethylene vinyl acetate between the polypropylene lamina and the polyethylene lamina. A suitable polyethylene vinyl acetate copolymer would be one containing about 8.5 percent vinyl acetate. The outer lamina opposite the polypropylene face of the laminate would be a foamed latex material to act as a good surface for contact with the floor. Such a laminate could be formed by the known co-extrusion of the plies or by the adhering together of separate films. If the laminate is co-extruded it can be oriented using the bubble technique and the oriented laminate can be irradiated. The polypropylene lamina does not readily cross-link when subjected to irradiation and, therefore, the crosslinking would predominantly occur only in the polyethylene and latex foam laminas. The foam could be formed at the time of extrusion if the co-extrusion technique is used. However, if independent sheets are formed, foaming can conveniently be carried out at other times also. In addition, this embodiment could use the techniques previously described for foaming after the face yarn has been adhered to the laminate and after the laminate had been shrunk.

The invention will be better illustrated by the following examples.

Example I

A foamable sheet of thermoplastic is prepared by blending 6,300 parts by weight of low density polyethylene (Dow Chemical Co.'s MX 94844) with 180 parts by weight of a powdered Azodicarbamide (Naugatuck Chemcial Co.'s Celogen AZ). The mixture is then extruded in tubular form on a one-inch NRM extruder operated under the following conditions: rear barrel 290°F., center barrel 300°F., forward barrel 295°F., adaptor 300°F., neck 300°F., die 295°F., tubing speed 18 f.p.m., tubing thickness 30 mils, the tubing has a collapsed width of four inches.

The collapsed tubing is irradiated using an ICT generator at 20 MR at 18 f.p.m. After irradiation the tubing is oriented using the bubble technique under the following conditions: pinch roll speed 14 f.p.m., deflate roll speed 44 f.p.m., preheat temperature 211°F., hot bath temperature 211°F., film thickness 2.7 mils. The expanded tubing is 14 inches wide when collapsed. The tubing is slit and separated into two webs.

Forty polyethylene yarn bundles are then unrolled from spools and once initially sealed at their loose ends several times to the previously prepared sheet in parallel lines spaced one-quarter inch apart are continuously sealed at intervals of about one-half inch by pressing with a ⅛ inch wide heating bar sequentially and pulling the sheet forward sequentially. The roll and spools remain in fixed positions and unroll. The sealer is an impulse type sealer which is operated at one-half second of heating and one-half second of cooling with a voltage of about 160V for a 2 foot length of heater bar. The areas contacted by the bar have their orientation relieved but retain substantially their original dimension.

The composite material is then heat shrunk by heating with a hot air source applied to the bottom of the sheet opposite the sealed yarn. The temperature of the material is approximately 200°–300°F. The film shrinks about 50 percent in the longitudinal direction and about 50 percent in width which is lateral to the path of the sealing bar.

After shrinking, the film is passed over a grid having ¼ inch circular holes spaced 1 inch apart. The grid moves with the film and acts as a masking surface. This movement of the grid is accomplished by forming the grid in a continuous belt member that moves at the rate of speed of the film backing and sequentially with the film backing. The film exposed in the circular holes is heated to about 500°F. and the azodicarbamide is decomposed foaming the plastic sheet in a pattern. The plastic sheet has little balloon like foam protuberances which may actually contact one another at most places and distributed as generally shown in FIG. 6. The end product face appearance was that shown graphically in FIG. 1.

Example II

The process of Example I is repeated except the foaming agent is omitted from the blend and the face material is a non-woven open mesh web as described in Example 7 of U.S. Pat. No. 3,539,666. The fabric is plied three times as shown in FIG. 4. The shrinkage and other relevant characteristics are observed to be substantially the same as in Example I and the end product is as graphically shown in FIG. 3.

Example III

The procedure of Example I is repeated except the face fabric of Example II is used in the manner shown in FIG. 5 with the fabric being slit and twisted as graphically shown. The fabric is three ply on the roll to give added bulk. The shrinkage and other relevant characteristics were substantially those described respecting Example I.

Example IV

The film of Example I is shrunk omitting the face material and therefore without being subjected to the sealing step. In other respects the process is the same. The film shrunk longitudinally 50 percent and transversely 50 percent. The film is then foamed in a hot air oven, raising the entire film to about 500°F. The shrunk film expands about 50 percent in thickness, 50 percent in width and 50 percent in length.

Example V

The procedure of Example III is repeated except the film is not shrunk and is clamped in place to prevent shrinkage. The resulting film is found to be expanded in only one direction, thickness.

Example VI

The procedure of Example II is repeated except the face yarn is polypropylene yarn bundles that in other respects were the same as the polyethylene bundles of Example I. The backing sheet is a laminate with the bonding lamina next to the face yarn being polypropylene. The intermediate lamina is polyethylene which provides heat seal strength and protection against burn-through. An ethylene vinyl acetate copolymer lamina containing 8.5 percent vinyl acetate serves as a bonding or adhesive layer between the polypropylene lamina and the polyethylene lamina. An outer foamed latex lamina is on the side of the polyethylene opposite the polypropylene. The laminate is formed by extrusion as tubular film and bubble oriented. The tubular member is collapsed and irradiated in the manner described in Example I. The irradiation cross-links the polyethylene lamina and the latex lamina. This cross-linking gives the polyethylene good burn-through characteristics during the heat sealing.

It will be apparent that many widely different embodiments of this invention may be made without departing from the spirit and scope thereof, and therefore it is not intended to be limited except as indicated in the appended claims.

I claim:

1. A fabric comprising
   a. a solid continuous base sheet of thermoplastic material having spaced areas wherein the sheet is unoriented and intervals between said spaced areas wherein the material is biaxially oriented but will not shrink at temperatures below 180°F., and
   b. fibrous material fusion bonded to said sheet at the spaced areas and buckled up between spaced areas in both the longitudinal and transverse dimensions of said sheet.

2. The fabric of claim 1 wherein the fibrous material buckled up between the spaced areas is at least twice as long as the distance between the spaced areas.

* * * * *